April 12, 1938.     P. SPIESS     2,113,996
COOKING APPARATUS
Original Filed March 7, 1934     4 Sheets-Sheet 1

Inventor
Paul Spiess
per Karl H. May
Attorney

April 12, 1938.　　　　　P. SPIESS　　　　　2,113,996
COOKING APPARATUS
Original Filed March 7, 1934　　4 Sheets-Sheet 2
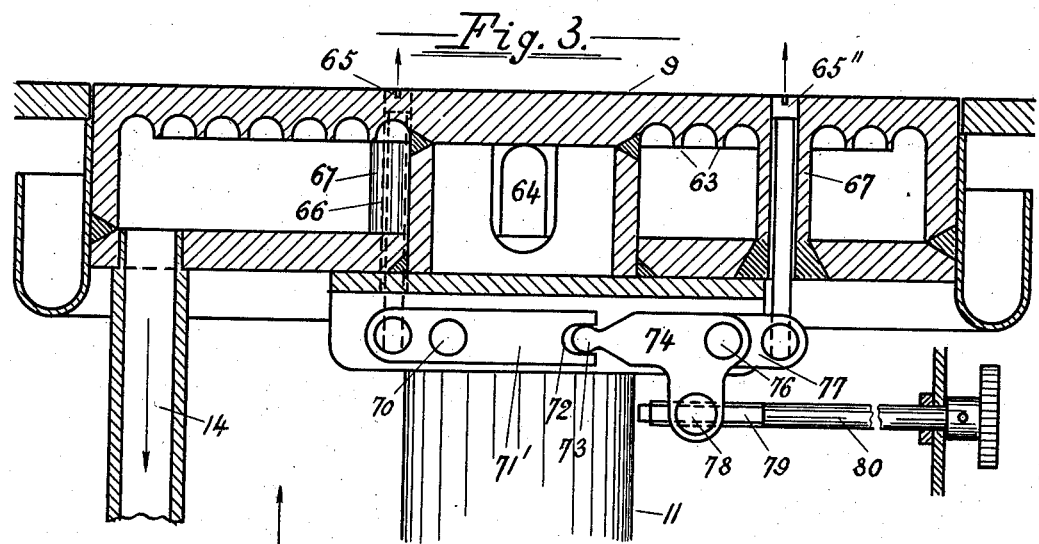
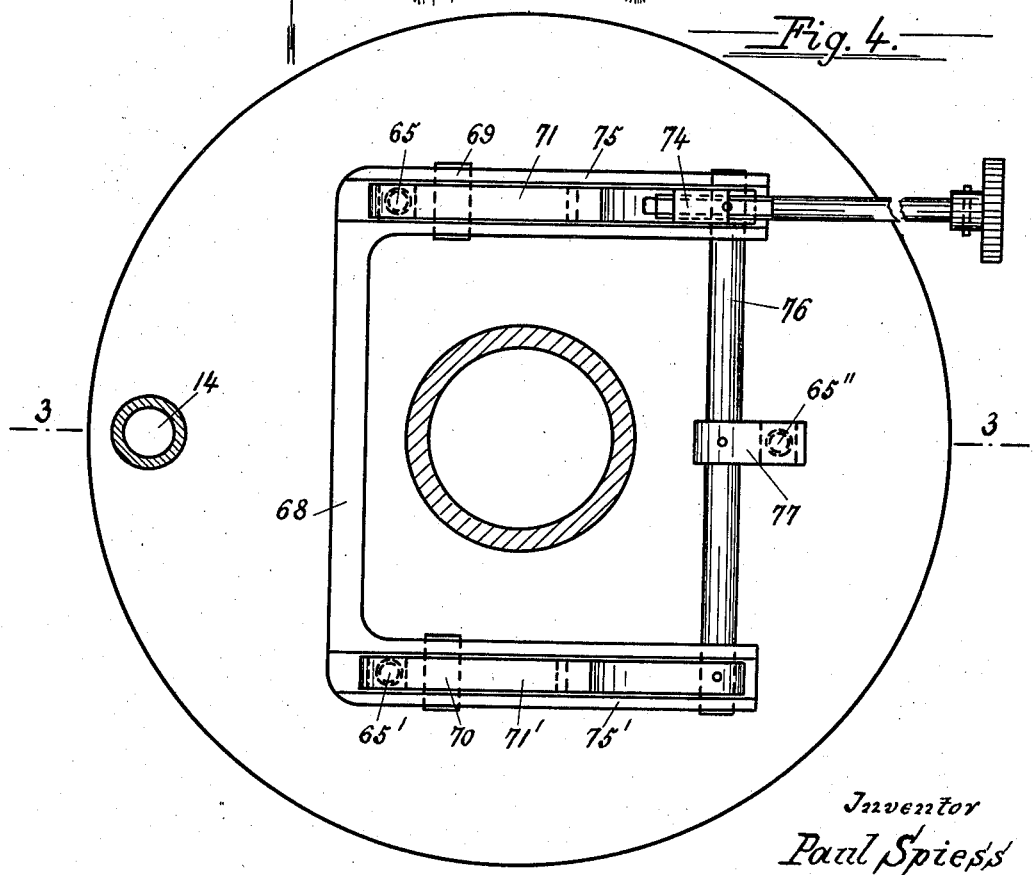
Inventor
Paul Spiess
per Karl H. Mayr
Attorney April 12, 1938.    P. SPIESS    2,113,996
COOKING APPARATUS
Original Filed March 7, 1934    4 Sheets-Sheet 3

Inventor
Paul Spiess
per Karl A. Mayr
Attorney.

Patented Apr. 12, 1938

2,113,996

UNITED STATES PATENT OFFICE 2,113,996

COOKING APPARATUS

Paul Spiess, Zollikon-Zurich, Switzerland

Application March 7, 1934, Serial No. 714,479.
Renewed July 23, 1935. In Switzerland March 8, 1933

27 Claims. (Cl. 219—37)

This invention relates to improvements in the design of cooking stoves and ovens, more particularly to cooking machines having heat accumulators.

An object of this invention resides in the provision of a cooking range for kitchens which can be supplied at any time or permanently with small amounts of heat per time unit and from which heat is always available at temperatures and in quantities such as are required for kitchen cooking.

An object of this invention is to provide a heat storage system consisting of high and low temperature storage stages and wherein only the high temperature stage is supplied with heat, while the consecutive stages receive heat from the high temperature stage.

An object of this invention is the provision of a method for accumulating heat in a plurality of stages operating at various temperatures and pressures and of provisions of heat conductively interconnecting the various stages.

An object of this invention is to provide a method for accumulating heat according to the two foregoing objects and for applying this method to cooking ranges for kitchens.

A further object of this invention is the provision of a kitchen range according to the foregoing object and of cooking plates in connection therewith and of control means associated with said cooking plates for regulating the heat supply from the cooking plates to the matter to be fried or cooked.

An object of this invention resides in the provision of a multistage heat accumulator system in connection with cooking ovens for kitchens and of a baking oven associated therewith and of control provisions for controlling the heat supply to said baking oven.

An object of this invention is to provide a kitchen range and baking oven according to the foregoing objects and automatically acting provisions for preventing any unnecessary loss of heat.

An object of the present invention is the provision of a special design for cooking plates to be used in connection with ranges according to the foregoing objects which secures best heat transfer conditions to the cooking pots, frying pans, baking ovens etc.

Further and other objects of the present invention will be hereinafter set forth in the accompanying specification and claims and shown in the drawings which, by way of illustration, show what I now consider to be a preferred embodiment of my invention.

In the drawings:

Fig. 3 is a cross sectional view of a cooking plate according to my invention and of a modification of a control mechanism.

Fig. 4 is a view of the cooking plate and control mechanism looking in the direction of the arrow on Fig. 3.

Figure 1:
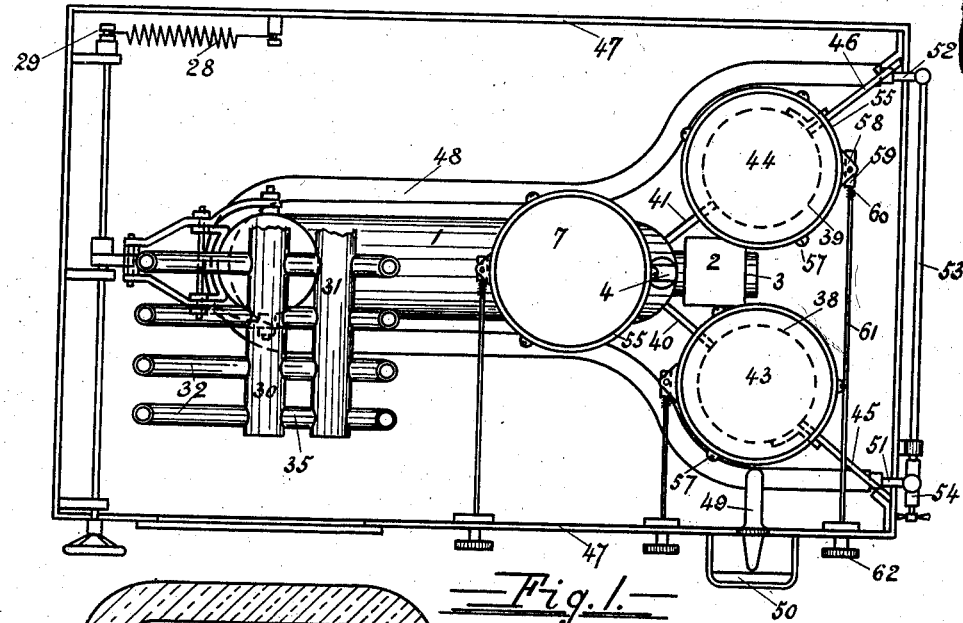
Fig. 1 is a part sectional top view of a cooking machine according to my invention with the cover plate removed.
Figure 2:
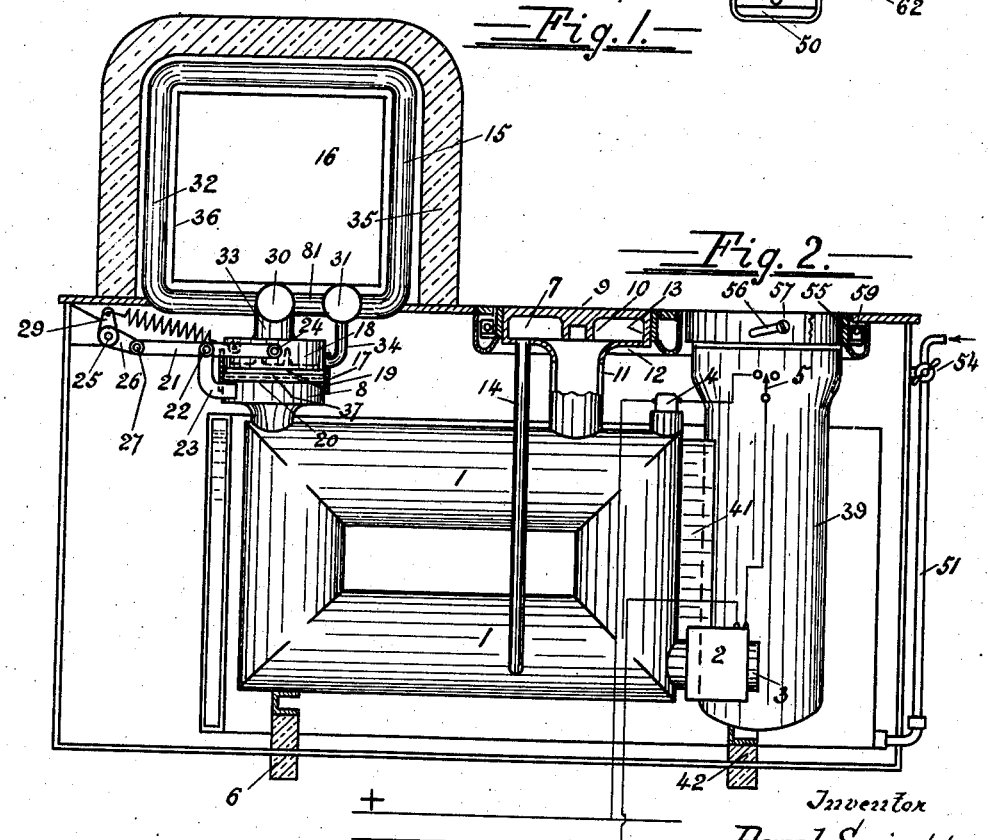
Fig. 2 is a part sectional side view of a cooking machine according to Fig. 1.

Referring more particularly to the drawings:

1 in Figs. 1 and 2 is a high pressure accumulator constituted by a rectangular frame built of four heavy steel tubes diagonally joined together at the corners, e. g., by means of welding. This construction is very strong—stronger than one which, e. g., uses elbow pieces or the like. Accumulator 1 is evacuated and almost entirely filled with a medium of high heat storage capacity, e. g. water. The quantity of the medium is such that, when it is heated up to the maximum operating temperature, it entirely fills the storage vessel. Heat is supplied to the accumulator by the cylindrical electrical heating element 2 which is heat conductively slipped over the tube stump 3 welded to the lower part of the accumulator vessel 1. It is obvious that, with such an arrangement, the electric element can easily be exchanged when it is worn out or when it is desired to replace it by one of larger or smaller capacity.

At the upper part of vessel 1 a thermostatic control device 4 is attached which cuts off the supply of electric current to heating element 2 whenever the temperature of the accumulator has reached a certain predetermined value, e. g. 500° F., and switches the current on whenever the temperature is below a certain predetermined value, e. g. 460° F. This control device may be combined with a safety control which definitely cuts off the current whenever the temperature rises above a certain permissible value, e. g. 535° F. in case the temperature control does not function properly. Temperature control, safety switch and heating element 2 are electrically arranged in series. Details of the thermostatic control and the safety switch which may consist of a fuse melting at a certain temperature and thereby cutting off the current are not shown because such devices are well known. A hand switch is provided which is also arranged in series with the before mentioned controls by means of which the current can be manually switched on or off.

The accumulator vessel 1 is carried by support 6 of heat insulating material. Cooking plates 7 and 8 are provided on top of the vessel. The plate 7 consists of a cooking surface 9 which must be absolutely plane in order to provide good contact with the pans or pots placed on it. To assure that the surface remains flat, reinforcing ribs 10 are provided. These serve, at the same time, to improve the heat transfer conditions from the heat coming from vessel 1 through the tubular support member 11 which is connected to the cooking plate by the annular bottom piece 12 which is welded to the tubular member 11 and the downward extending rim 13 of the cooking plate. A return tube 14 connects the interior of the cooking plate with the lower part of the accumulator and returns the condensate of the vapor condensing in the interior of the cooking plate while its heat is transmitted to the plate and materials to be cooked.

Since vessel 1 is entirely filled with a medium of high heat storage capacity, e. g. water, and the space within the cooking plate and connecting conduit 11 is small, the storage medium will never be completely evaporated, and saturated vapor only is used for transmitting the heat stored in the medium to the cooking plate. It is a well known fact that best heat transfer conditions are obtained when condensing saturated vapor; with superheated vapor the transfer conditions are not nearly so good, and this is the reason why I use the specified method which prevents production of superheated vapor.

Cooking plate 8 is of similar construction as is plate 7. Its purpose, however, is to transmit the heat stored in accumulator 1 to a tube system 15 which surrounds and heats the frying or baking oven 16 located on top of the cover plate of the range and, therefore, easily accessible. Since the baking oven is not always in use, provisions are made to disconnect the tube system 15 from the cooking plate 8. For this purpose, plate 8 is provided with an annular projecting ring or guide 17. A hollow heat receiving body 18 closely fits into the guide 17 and has a lower flat surface 19 corresponding to the flat surface 20 of cooking plate 8. As long as the two surfaces are in contact, heat is transmitted to body 18 from plate 8 and accumulator 1. Upon lifting body 18 from surface 20 the flow of heat is interrupted. This lifting is done by lever 21 fulcrumed at 22 to a stationary support 23 mounted to plate 8. Through bolt 24 one arm of the lever carries body 18. The other arm can be rotated by rotating shaft 25 connected to the arm by crank 26 and pin 27.

In Fig. 2 body 18 is in lifted position. Spring 28 mounted at one end to the casing of the range and, with the other end, pulling on crank 29 which is rigidly connected to shaft 25 maintains body 18 in raised position unless shaft 25 is turned counter-clockwise whereupon body 18 is pressed toward plate 8. By suitably dimensioning levers 26 and 29 or by interposing a gear transmission, spring 28 is not only prevented from acting but can also be used to force surface 19 against surface 20 thereby maintaining good heat conducting conditions. The provision of the spring actuated mechanism prevents waste of heat when the baking oven is not in use inasmuch as it definitely disconnects heating system 15 from accumulator 1.

The construction of tube system 15 for heating the baking oven is obvious from Figs. 1 and 2. It consists of a distributing header 30 and a condensate collecting header 31 which are connected by a plurality of radiating elements 32 arranged in parallel and surrounding the interior of baking chamber 16. Header 30 is directly connected to body 18 by the short tube connection 33; header 31 is connected to the lower part of body 18 by the condensate return pipe 34. Connectors 81 may be provided between the headers 30 and 31. Body 18 is filled with a medium which evaporates at the temperatures available from accumulator 1 but is not superheated at such temperatures. When surfaces 19 and 20 are brought together, the medium within body 18 is evaporated and the vapor enters tubes 32 thereby heating the interior of the baking oven. The condensate of the vapor is directly returned to body 18 by tube 34.

The evaporative medium enclosed in vessel 18 is small and evaporates in a very short time whenever the faces 19 and 20 are brought into contact. Tube system 15 is evacuated before body 18 is filled so that best heat transfer conditions between the saturated steam inside the tubes and the tube walls are obtained.

In vessel 1 a large quantity of heat is accumulated and, on the other hand, the amount of medium to be evaporated for transmitting heat to tube system 15 is small so that the interior of the baking oven almost instantaneously reaches the desired temperature. In this way my oven is much different from known arrangements where the baking oven is individually electrically heated; unless the current supply provisions and electric heating elements have a great capacity, it takes a very long time to obtain the desired temperature within the oven. Large capacity of the electric connections and heating elements, however, are very expensive and yet are never able to instantly supply such large quantities of heat as can be had from accumulator 1.

The baking oven and tube system are enclosed in casing 35 of heat insulating material. Inside a metal lining 36 may be provided. Since the mass of tubes 15 and the construction of the casing of the baking oven will, as a rule, have sufficient heat storage capacity, an "on" and "off" control of the heat supply as described will meet the ordinary operating conditions. By a gradual lifting of body 18 from surface 20 the heat supplied to the baking oven can be controlled and any temperature condition in the oven maintained by holding a certain clearance between surfaces 19 and 20. In order to improve the heat transmitting conditions between surfaces 19 and 20, a medium 37 which is liquid but does not evaporate at the temperatures used may be provided on surface 20 and within cylinder 17. Metal alloys having a lower fusing point or glycerine may be used for this purpose. A plurality of cooking plates 8 and bodies 18 may be provided to serve the same baking oven. Since air is a bad conductor of heat, a small clearance between the surfaces 20 or the liquid 37—if such is provided—assures a complete interruption of the heat flow.

Since, for kitchen cooking, not only high temperatures are required as are available from plate 7, additional storage provisions are made to operate between say 220° F. and 430° F. Being built for lower pressures, these are lighter and cheaper and require less insulation than does the high temperature high storage vessel 1. In the embodiment of my invention according to Figs. 1 and 2 of the drawings, two low pressure vessels 38 and 39 are provided. They have no individual electric or other heat supply apparatus connected thereto, but the heat is transmitted to these vessels from the high pressure accumulator 1 by metal strips 40 and 41 which are welded to vessel 1 and vessel 38 or 39, respectively. They serve at the same time to combine the three vessels into a rigid unit so that only one other support 42 beside support 6 need be provided and very little heat is conducted away through these supports. Being at the low and cold end of vessels 38 and 39, support 42 will conduct very little heat from these low temperature vessels. The amount of heat transmitted to vessels 38 and 39 depends on the heat conductive qualities and the dimensions of strips 40 and 41. These may be different for vessels 38 and 39. There may be also adjustable provisions for increasing or decreasing the heat conducting capacity of the connections 40 and 41.

Different methods may be used for transmitting the heat from the high pressure vessel to the low pressure vessels, e. g. a tube coil may be arranged in the low pressure vessel through which a storage medium is supplied from the high pressure vessel. The low pressure vessels are almost entirely filled with a medium of high heat storage capacity while the air is entirely removed from the interior of the vessels. Inasmuch as the heat storage capacity of, e. g., water is much greater within the low temperature range than at high temperatures, the storage capacity of the low pressure vessels is much greater. This conforms with the common cooking practice where about five times as much heat is used for the finishing stages of the cooking process than for baking and frying which is carried out at the high temperature plate 7.

If the heat accumulation were carried out in one stage only, the capacity would need to be so large that the available temperature would never fall below say 480° F. which is needed for frying. At such temperatures the heat storage capacity per weight unit of the storage medium is small, and large high pressure vessels would be required which operate at high temperature and naturally have great radiation losses. According to the beforementioned experience that only about ⅕ of the heat is required at such high temperature, high pressure storage alone would mean an unnecessary first cost of the apparatus and permanent heat losses. The bodies 38 and 39 are fixed in their position with respect to the outer shell 47 of the oven by members 45 and 46 which consist of non-heat conducting materials. The top of the vessels 38 and 39 is formed by the cooking plates 43 and 44 which are of the same design as the above described plate 7.

In order to produce warm water and to efficiently absorb heat radiating from the surface of the accumulators, a warm water vessel 48 is provided the shape of which resembles a horse shoe and which surrounds the high pressure vessel and low pressure accumulators. The opening of the horse shoe is where the accumulators are which radiate little heat. This arrangement renders, at the same time, the boss 3 and the heating element 2 accessible. A discharge is provided to take warm water from the vessel. This consists of a U-shaped tube 49 one leg of which extends way down into the water vessel and the other into a trough 50. Fresh water is filled into the lower part of vessel 48 through tubes 51 and 52 the latter having a horizontal part 53 at a convenient elevation. On the point of connection of part 53 and tube 51 a valve 54 is provided to which the fresh water main also is connected. Upon opening the valve both conduits 51 and 53 are supplied with fresh water and, consequently, both legs of the horse shoe shaped warm water vessel. If the vessel is full, water will overflow through pipe 49. Whenever warm water is needed, valve 54 must be opened and the water will readily flow out of pipe 49. The latter being permanently open also prevents dangerous pressure from being built up in vessel 48.

In order to provide for a regulation of the heat supplied to the frying pans or cooking pots etc. placed on the cooking plates 7, 43 or 44, the latter are provided with a control mechanism which is more particularly shown in Figs. 1 and 2 in connection with cooking plate 44. This mechanism consists of a cylindrical ring 55 snugly but revolvably fitting around the cooking plate. This ring has three inclined slots 56 which slidably cooperate with three bolt members 57 which are mounted to the cooking plate. Ring 55 is provided with flaps 58 which revolvably support the nut member 59; this has an internal thread cooperating with the thread end 60 of regulating rod 61. The latter extends through and is carried by the front wall of the oven casing 47 and is provided with a handle 62. By turning this handle ring 55 is revolved and slides downward or upward, due to the inclination of the slots 56, according to whether handle 62 is turned to the right or the left. The pan or pot standing on the cylindrical ring 55 is lifted from the plate surface whenever ring 55 is moved upward. A small clearance between the cooking plate and the pan is sufficient to decrease the heat supply considerably.

The before described control arrangement is only applicable as long as pans or pots are used having an outside diameter which is equal to or larger than the diameter of ring 55. In order to provide for pots of any size, a control arrangement according to Figs. 3 and 4 may be used. Fig. 3 also shows a modified design of a cooking plate. The part which serves for transmitting heat to the cooking utensils is provided with annular rings 63 which stiffen the plate and simultaneously enlarge the internal condensing surface of the plate and considerably increase the heat transfer conditions from the steam to the plate. Tube 11 connecting the plate with the accumulator extends right into the plate and assists in supporting the upper disc. Openings 64 are provided in that part of tube 11 which extends into the interior of the plate to provide a passage for the steam. The condensate is drained through tube 14 which leads to the lower part of the accumulator. The control mechanism consists of three pins 65, 65' and 65" which slide in the bores 66 of the reinforcing columns 67. Pins 65 and 65' are revolvably mounted to levers 71 and 71' which are revolvable around pins 69 and 70 which are mounted to legs 75 and 75' of a U-shaped frame 68 which is connected to the under side of the cooking plate. The ends of levers 71 and 71' are provided with slots 72 which accommodate the ball-like extensions 73 of one horizontal leg of T-pieces 74. The other horizontal legs are keyed to and carried by rod 76 which revolvably extends through both legs of frame 68. The carrying pin 65" is revolvably connected to arm 77 mounted on the center of rod 76. The vertical leg of one of the T-pieces 74 revolvably carries bolt 78 which has a threaded transverse bore cooperating with the threaded end 79 of regulating rod 80. It is obvious that, upon turning rod 80, T-piece 74 is turned clockwise or counter-clockwise whereby all pins 65 are moved downward or upward. A pan standing on the upper ends of the pins is thus moved toward the cooking plate or lifted from it.

Figure 5:
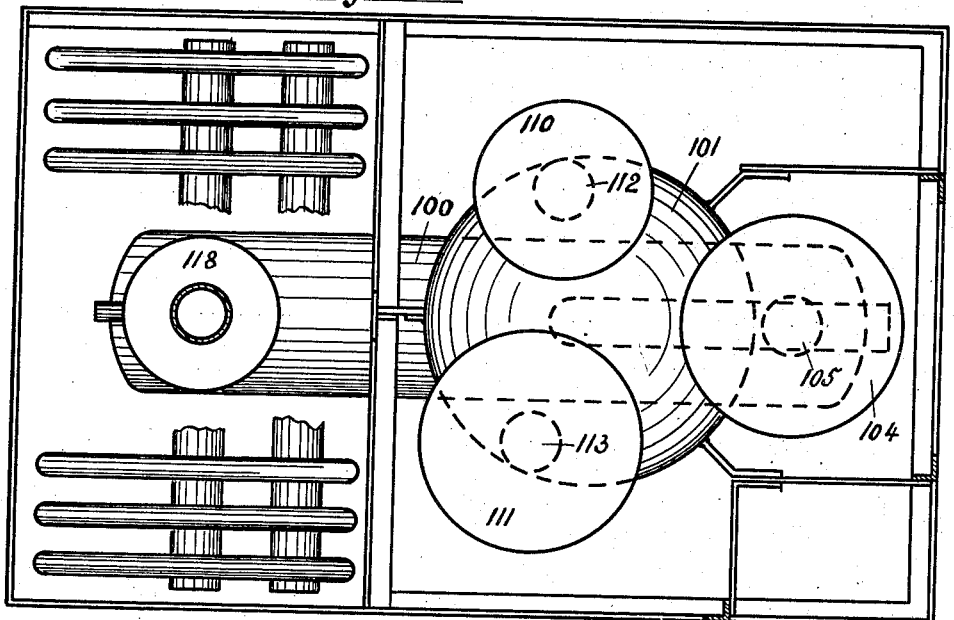
Fig. 5 is a top view of a modified design of a cooking range according to my invention.
Figure 6:
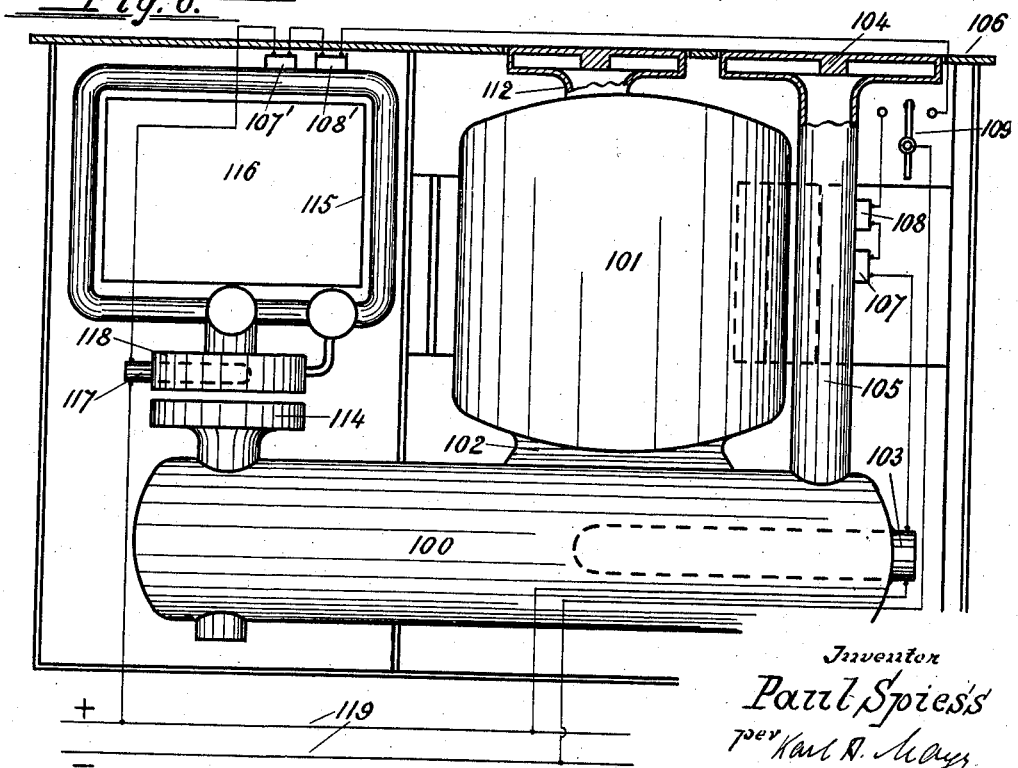
Fig. 6 is a side view of the cooking range according to Fig. 5.

Having described my invention by way of the embodiment illustrated in Figs. 1 to 4, inclusive, I proceed to describe another embodiment thereof as illustrated in Figs. 5 and 6. In this case the high pressure and high temperature accumulator consists of a cylindrical vessel 100, and the low pressure accumulator of only one upright cylindrical vessel 101 which is mounted on top of the high pressure vessel. Heat is conducted from the high pressure accumulator to the low pressure vessel through plate 102 which connects the two vessels and substantially supports the low pressure vessel. For heating the high pressure vessel a tube 103 closed on one side is inserted into the high pressure vessel parallel to its longitudinal axis and welded to the wall of the vessel from which it projects. A cylindrical electric heating element is inserted into this tube. If electricity is not available, I may insert a gas burner. The vertical tube 105 connects the cooking plate 104 to the vessel 100. The surface of the cooking plate is in the same plane as the top cover 106 of the oven. An automatic temperature control 107 and a safety cut off 108, as was described in connection with the embodiment of my invention according to Figs. 1 and 2, are associated with the upright tube 105. These devices, the switch 109 and the heating element inside tube 103 are in series with respect to the current or gas flow. The low pressure vessel 101 carries two cooking plates 110 and 111 which are connected to the accumulator by way of the tubes 112 and 113. The cooking plates themselves are of the same design as described in connection with Figs. 1 to 4. The high pressure accumulator carries a further cooking plate 114 for transmitting heat to a tube system 115 which surrounds and heats baking oven 116. Control of the heat supply to this tube system is the same as was described in connection with the embodiment of my invention according to Figs. 1 and 2. I may make additional provisions for direct electric heating of the tube system 115 by inserting a tube 117, similar to the before described tube 103, into the heat receiving body 118 and by inserting a heating element into tube 117. A thermostatic control 107' and a safety cut off 108' are arranged on the tube system and in series with the heating element. In order not to overload the electric supply mains 119 by simultaneous operation of the electric heating element for the baking oven and that of the high pressure accumulator, I provide a threeway switch 109 which assures that current is supplied either to the one or to the other heating element and simultaneous operation is definitely prevented. The baking oven is arranged on the side of the low pressure vessel 101 and does not extend beyond the plane of the cover plate 106 of the range. The design according to Figs. 5 and 6 requires less space and is cheaper to manufacture than the previously described range. Its storage capacity, of course, is smaller and radiation losses are greater.

Figure 7:
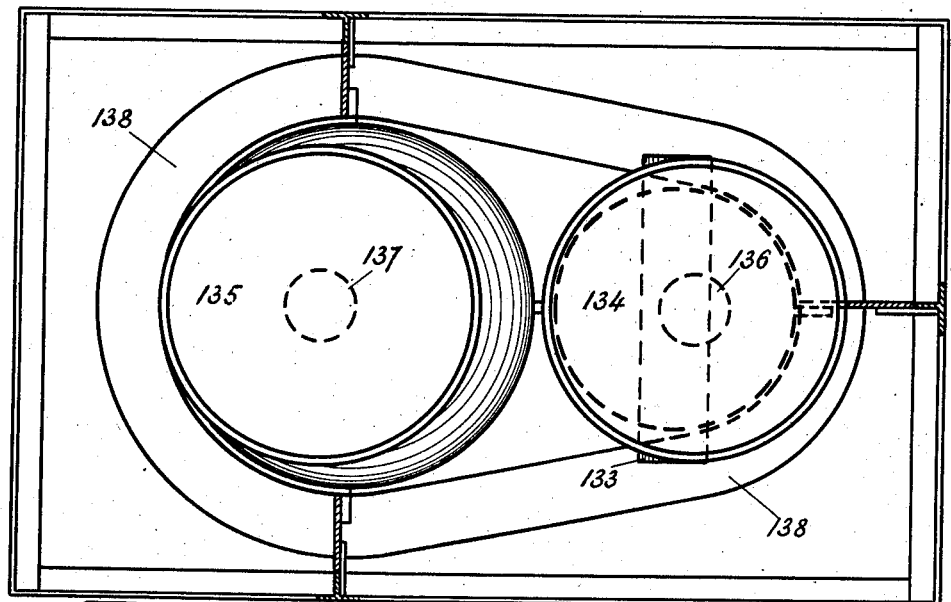
Fig. 7 is a top view of another modification of a cooking range according to my invention.
Figure 8:
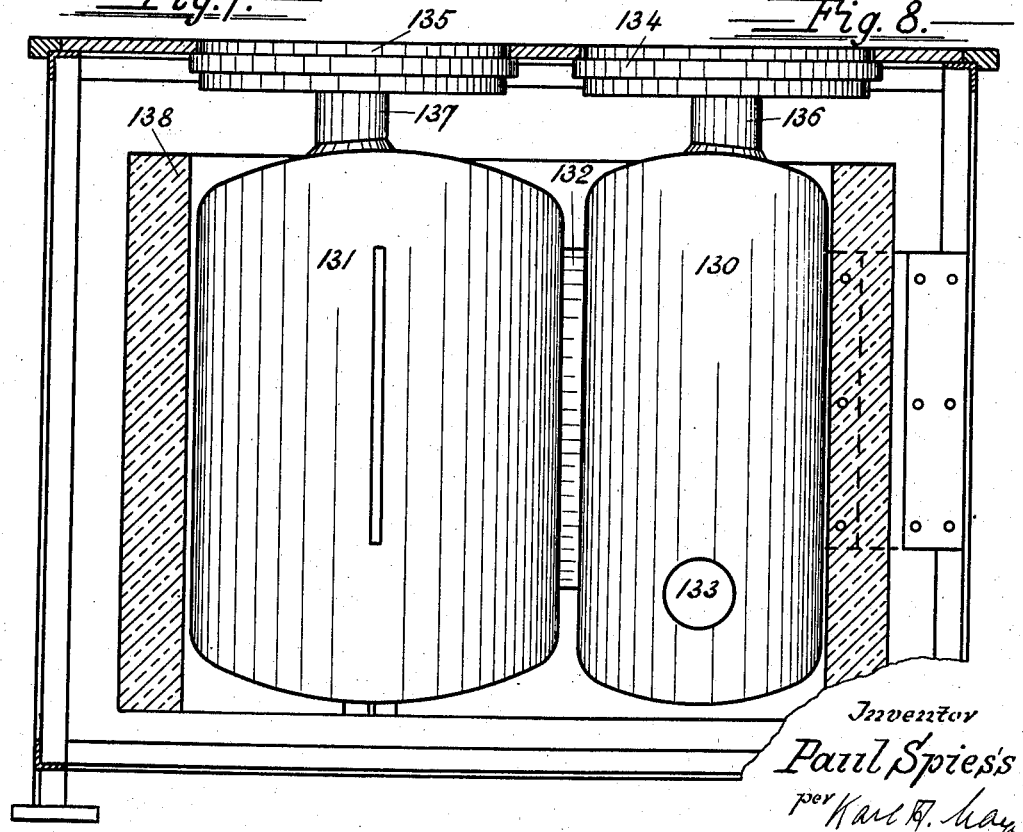
Fig. 8 is a side view of the range illustrated in Fig. 7.

Figs. 7 and 8 show a still more simplified application of my invention. The high pressure accumulator 130 and the low pressure accumulator 131 both consist of cylindrical vessels standing upright and side by side. They are heat conductively connected by the strip 132. Heat is supplied to the high pressure vessel 130 which has for this purpose at its lower end a tube 133 piercing right through the vessel and welded to the walls of the vessel. An electric or other heating element can be inserted into this tube. There are only two cooking plates 134 and 135, the former being connected with the upper part of the high pressure vessel through tube 136, and the latter with the low pressure vessel through tube 137. Both vessels are surrounded by a heavy coat 138 of insulating material.

While I believe the above described embodiments of my invention to be preferred embodiments, I wish it to be understood that I do not desire to be limited to the exact details of process, design and construction shown and described, for obvious modifications will occur to a person skilled in the art.

What I claim is:

1. In a cooking stove, a plurality of pressure vessels containing a medium of high heat storage capacity, said vessels being individually built for and operating at different pressures and temperatures of the medium contained therein, a heat supply device attached to the lower portion of that one of said vessels which is built for the highest pressure, and heat conducting means interconnecting said vessels whereby the vessels built for and operating at lower pressures and temperatures receive their heat from the vessel built for and operating at higher temperatures.

2. In a cooking stove, a plurality of pressure vessels containing a medium of high heat storage capacity, said vessels being individually built for and operating at different pressures and temperatures of the medium contained therein, a heat supply device attached to the lower portion of that one of said vessels which is built for the highest pressure, and heat conducting means interconnecting said vessels whereby the vessels built for and operating at lower pressures and temperatures receive their heat from the vessel built for and operating at higher temperatures, one of said vessels consisting substantially of four tubes joined together in the form of a rectangular frame.

3. In a cooking stove, a plurality of pressure vessels containing a medium of high heat storage capacity, said vessels being individually built for and operating at different pressures and temperatures of the medium contained therein, a heat supply device attached to the lower portion of that one of said vessels which is built for the highest pressure, and heat conducting means interconnecting said vessels whereby the vessels built for and operating at lower pressures and temperatures receive their heat from the vessel built for and operating at higher temperatures, one of said vessels consisting substantially of four tubes joined together in the form of a rectangular frame the individual tube ends of which are cut at an angle of 45° with respect to the axis of the tube.

4. In a cooking stove, a frame built of tubes and constituting a high pressure vessel having an upper and a lower portion and a substantially vertical side, two upright cylindrical low pressure vessels located near the vertical side of said frame and being heat conductingly connected therewith, all of said vessels containing a medium of high heat storage capacity, a tubular extension connected to the lower portion of said frame and extending in between said two low pressure vessels, heat supply means associated with said tubular extension, and a cooking plate attached to the upper portion of said frame, and other cooking plates attached to said low pressure vessels.

5. In a cooking stove, a frame built of tubes and constituting a high pressure vessel having an upper and a lower portion and a substantially vertical side, two upright cylindrical low pressure vessels located near the vertical side of said frame and heat conductingly connected therewith, all of said vessels containing a medium of high heat storage capacity, a tubular extension connected to the lower portion of said frame and extending in between said two low pressure vessels, heat supply means associated with said tubular extension, a cooking plate attached to the upper portion of said frame, and other cooking plates attached to said low pressure vessels, all said cooking plates being in one plane.

6. In a cooking stove, a frame built of tubes and constituting a high pressure vessel having an upper and a lower portion and a substantially vertical side, two upright cylindrical low pressure vessels located near the vertical side of said frame and heat conductingly connected therewith, all said vessels containing a medium of high heat storage capacity, a tubular extension connected to the lower portion of said frame and extending in between said two low pressure vessels, heat supply means associated with said tubular extension, cooking plates attached to said low pressure vessels, a cooking plate attached to the upper portion of said frame, a heat transfer plate also attached to the upper portion of said frame, a tube system adapted to supply heat to a baking oven, and a heat receiving body attached to said tube system and adapted to heat transmittingly cooperate with said heat transfer plate.

7. In a cooking stove, a plurality of pressure vessels containing a medium of high heat storage capacity, said vessels being individually built for and operating at different temperatures and pressures of the medium contained therein, a heat supply device attached to the lower portion of that one of said vessels which is built for the highest pressure, heat conducting means interconnecting said vessels whereby the vessels built for and operating at lower pressures and temperatures receive their heat from the vessel built for and operating at higher temperatures, and a container laterally surrounding said vessels and adapted to absorb the heat radiating from said vessels and to usefully employ it for heating water in said container.

8. In a cooking stove, a plurality of pressure vessels containing a medium of high heat storage capacity, said vessels being individually built for and operating at different temperatures and pressures of the medium contained therein, a heat supply device attached to the lower portion of that one of said vessels which is built for the highest pressure, heat conducting means interconnecting said vessels whereby the vessels built for and operating at lower pressures and temperatures receive their heat from the vessel built for and operating at higher temperatures, and a container laterally surrounding said vessels and adapted to absorb the heat radiating from said vessels and to usefully employ it for heating water in said container, said container having a substantially U-shaped configuration, the open side of the U being adjacent to those of said vessels which are built for and operate at low temperatures.

9. In a cooking stove, a substantially drum-shaped high pressure vessel lying horizontally in the lower portion of said stove and filled with a medium of high heat storage capacity, a low pressure vessel located above said high pressure vessel and also containing a medium of high heat storage capacity, a heat conducting connection between said high pressure and low pressure vessels, a cooking plate attached to said low pressure vessel, a vertical tube attached to the upper side of said high pressure vessel and supporting another cooking plate located at the same elevation as said first mentioned cooking plate, and a heat supply device inserted in said high pressure vessel and adapted to supply heat thereto.

10. In a cooking stove, a high pressure and a low pressure vessel, each vessel containing a medium of high heat storage capacity and having substantially the shape of an upright cylindrical body, a cooking plate attached to the top of each vessel, a heat supply device attached to the lower end of said high pressure vessel, and a heat conducting connection between said two vessels.

11. In a cooking stove, a plurality of pressure vessels containing a medium of high heat storage capacity, said vessels being individually built for and operating at different pressures and temperatures of the medium contained therein, a heat supply device attached to the lower portion of that one of said vessels which is built for the highest pressure, heat conducting means interconnecting said vessels whereby the vessels built for and operating at lower pressures and temperatures receive their heat from the vessel built for and operating at higher temperatures, and hollow cooking plates attached to the upper portion of said vessels the interior of said hollow plates communicating with the interior of the vessel to which the plate is attached.

12. In a cooking stove, a plurality of pressure vessels containing a medium of high heat storage capacity, said vessels being individually built for and operating at different pressures and temperatures of the medium contained therein, a heat supply device attached to the lower portion of that one of said vessels which is built for the highest pressure, heat conducting means interconnecting said vessels whereby the vessels built for and operating at lower pressures and temperatures receive their heat from the vessel built for and operating at higher temperatures, at least one of said vessels having substantially the form of an upright cylindrical body, and a cooking plate forming the upper closure of the body.

13. In a cooking stove, a plurality of pressure vessels containing a medium of high heat storage capacity, said vessels being individually built for and operating at different pressures and temperatures of the medium contained therein, a heat supply device attached to the lower portion of that one of said vessels which is built for the highest pressure, heat conducting means interconnecting said vessels whereby the vessels built for and operating at lower pressures and temperatures receive their heat from the vessel built for and operating at higher temperatures, hollow cooking plates attached to the upper portion of said vessels, the interior of said hollow plates communicating with the interior of the vessel to which the plate is attached, said cooking plates having a plane surface for placing cooking utensils thereon, and reinforcing ribs associated with said surface and located in the interior of said plates and assuring that said surface remains absolutely plane under all operating conditions and improving the heat transmission from the medium within the vessel and cooking plate to said surface.

14. In a cooking stove, a pressure vessel having an upper and a lower portion and being filled with a liquid of high heat storage capacity, a heat supply device attached to the lower portion of said vessel, a hollow cooking plate, a vapor conduit connecting the interior of said plate with the upper portion of said vessel and conducting saturated vapor from the heated liquid within said vessel to said plate, and a condensate return conduit connecting the interior of said cooking plate with the lower portion of said vessel and returning the condensate of said vapor formed on said cooking plate to said vessel.

15. In a cooking stove, a pressure vessel having an upper and a lower portion and containing a medium of high heat storage capacity, a heat supply device attached to the lower portion of said vessel and a hollow cooking plate attached to the upper portion of said vessel whereby the interior of said plate communicates with the interior of said vessel, said cooking plate having a plane surface for placing cooking utensils thereon, and adjusting means associated with said cooking plate adapted to adjustably lift the cooking utensils from said surface.

16. In a cooking stove, a pressure vessel having an upper and a lower portion and containing a medium of high heat storage capacity, a heat supply device attached to the lower portion of said vessel and a hollow cooking plate attached to the upper portion of said vessel whereby the interior of said plate communicates with the interior of said vessel, said cooking plate having a plane surface for placing cooking utensils thereon, and adjusting means associated with said cooking plate adapted to adjustably lift the cooking utensils from said surface, said adjusting means consisting substantially of a support member for supporting the cooking utensils, said support member being slidably associated with said plate, and a lifting member associated with said support member and adapted to change the position of said support member with respect to said surface.

17. In a cooking stove, a pressure vessel having an upper and a lower portion and containing a medium of high heat storage capacity, a heat supply device attached to the lower portion of said vessel and a hollow cooking plate attached to the upper portion of said vessel whereby the interior of said plate communicates with the interior of said vessel, said cooking plate having a plane surface for placing cooking utensils thereon, and adjusting means associated with said cooking plate adapted to adjustably lift the cooking utensils from said surface, said adjusting means consisting substantially of a support member for supporting the cooking utensils, said support member being slidably associated with said plate, and a lifting member associated with said support member and adapted to change the position of said support member with respect to said surface, said cooking plate having the shape of a disc and said support member consisting substantially of a ring-shaped part surrounding said cooking plate.

18. In a cooking stove, a pressure vessel having an upper and a lower portion and containing a liquid of high heat storage capacity, a heat supply device attached to the lower portion of said vessel and a hollow cooking plate attached to the upper portion of said vessel whereby the interior of said plate communicates with the interior of said vessel, and a horizontal upper surface on said cooking plate, a baking oven and a tube system surrounding said oven, a hollow body supportingly attached to said tube system and interiorly communicating with said tube system, said hollow body having a surface conforming with the surface of said cooking plate and adapted to be placed on said cooking plate and to transmit heat therefrom to said body and tube system.

19. In a cooking stove, a pressure vessel having an upper and a lower portion and containing a liquid of high heat storage capacity, a heat supply device attached to the lower portion of said vessel and a hollow cooking plate attached to the upper portion of said vessel whereby the interior of said plate communicates with the interior of said vessel, and a horizontal upper surface on said cooking plate, a baking oven and a tube system surrounding said oven, a hollow body supportingly attached to said tube system and interiorly communicating with said tube system, said hollow body having a surface conforming with the surface of said cooking plate and adapted to be placed on said cooking plate and to transmit heat therefrom to said body and said tube system, and a high heat conductive substance of low fusing and high evaporating temperature as compared with the temperatures at which said plate and body are operated interposed in between said plate and body to improve the heat transmission from said plate to said body.

20. In a cooking stove, a pressure vessel having an upper and a lower portion and containing a liquid of high heat storage capacity, a heat supply device attached to the lower portion of said vessel and a hollow cooking plate attached to the upper portion of said vessel whereby the interior of said plate communicates with the interior of said vessel, and a horizontal surface on said cooking plate, a baking oven and a tube system surrounding said oven, a hollow body supportingly attached to said tube system and interiorly communicating with said tube system, said hollow body having a surface conforming with the surface of said cooking plate and adapted to be placed on said cooking plate and to transmit heat therefrom to said body and said tube system, and an adjusting mechanism adapted to lift the surface of said body from the surface of said cooking plate and to thereby adjust the amount of heat transmitted from said vessel and said cooking plate to said body, said tube system and said baking oven.

21. In a cooking stove, a pressure vessel having an upper and a lower portion and containing a liquid of high heat storage capacity, a heat supply device attached to the lower portion of said vessel and a hollow cooking plate attached to the upper portion of said vessel whereby the interior of said plate communicates with the interior of said vessel, and a horizontal surface on said cooking plate, a baking oven and a tube system surrounding said oven, a hollow body supportingly attached to said tube system and interiorly communicating with said tube system, said hollow body having a surface conforming with the surface of said cooking plate and adapted to be placed on said cooking plate and to transmit heat therefrom to said body and said tube system, and an adjusting mechanism adapted to lift the surface of said body from the surface of said cooking plate and to thereby adjust the amount of heat transmitted from said vessel and said cooking plate to said body, said tube system and said baking oven, said mechanism comprising a loading member which definitely holds said body in a lifted-up position as long as said adjusting mechanism is not operated.

22. In a cooking stove, a high pressure and a low pressure vessel, each vessel containing a medium of high heat storage capacity, a cooking means attached to the top of each vessel, heat supply means attached to said high pressure vessel, and a heat conducting connection between said two vessels.

23. In a cooking stove, a permanently sealed high pressure vessel which is partially filled with a liquid of high heat storage capacity leaving a space in the upper portion of said vessel which is filled with vapor of said liquid, heat supply means connected to said vessel, a plurality of hollow cooking means adapted for having cooking utensils placed thereon and being permanently connected with the upper portion of said vessel, each of said cooking means having a heat transmitting surface which is located above the level of the liquid contained in said vessel, the interior of said cooking means communicating with the interior of the upper portion of said vessel which is filled with vapor which condenses within said cooking means thereby effectively conveying the heat contained in said liquid to said cooking means.

24. In a cooking stove, a permanently sealed high pressure vessel which is partially filled with a liquid of high heat storage capacity leaving a space in the upper portion of said vessel which is filled with vapor of said liquid, heat supply means connected to said vessel, a hollow cooking means adapted for having cooking utensils placed thereon and being permanently connected with the upper portion of said vessel and having a heat transmitting surface which is located above the level of the liquid contained in said vessel, the interior of said cooking means communicating with the interior of the upper portion of said vessel which is filled with vapor which condenses within said cooking means thereby effectively conveying the heat contained in said liquid to said heat transfer means.

25. In a cooking stove, a high pressure vessel having an upper and a lower portion, two low pressure vessels located adjacent to said high pressure vessel and being heat conductingly connected therewith, all of said vessels containing a medium of high heat storage capacity, heat transfer means individually connected to the upper portion of said vessels, heat supply means connected to the lower portion of said high pressure vessel and extending in between said two low pressure vessels.

26. In a cooking stove, a high pressure vessel located in the lower portion of said stove and filled with a medium of high heat storage capacity, a low pressure vessel located above said high pressure vessel and also containing a medium of high heat storage capacity, a heat conducting connection between said high pressure and low pressure vessels, heat supply means connected with said high pressure vessel and supplying heat thereto, a heat transfer means connected to said low pressure vessel and receiving heat therefrom, another heat transfer means, and heat conducting connecting means interconnecting said other heat transfer means with said high pressure vessel.

27. In a cooking stove, a pressure vessel having an upper and a lower portion and containing a liquid of high heat storage capacity, heat supply means connected to the lower portion of said vessel and supplying heat thereto, heat delivery means permanently and heat conductingly connected with the upper portion of said vessel and adapted to receive heat stored in said liquid, a heating apparatus which is movable with respect to said vessel and heat delivery means connected thereto, said heating apparatus having heat receiving means adapted to be heat conductingly connected with said heat delivery means for causing flow of heat from said heat delivery means to said heat receiving means and heating apparatus, and moving means connected to and movably interconnecting said heat delivery means and said heat receiving means, whereby said heat receiving means can be moved toward and from said heat delivery means, and the intensity of the flow of heat from said heat delivery means to said heat receiving means and said heating apparatus is increased and decreased, respectively.

PAUL SPIESS.